United States Patent
Chang et al.

(10) Patent No.: US 9,346,022 B2
(45) Date of Patent: May 24, 2016

(54) ANTIBIOFOULING COMPOSITION, ANTIBIOFOULING MEMBRANE AND METHOD FOR FORMING THE SAME

(75) Inventors: Yung Chang, Tao-Yuan (TW); Ruoh-chyu Ruaan, Tao-Yuan (TW); Yen-Che Chiag, Tao-Yuan (TW); Wen-Yih Chen, Tao-Yuan (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 651 days.

(21) Appl. No.: 13/442,017

(22) Filed: Apr. 9, 2012

(65) Prior Publication Data

US 2013/0228511 A1    Sep. 5, 2013

(30) Foreign Application Priority Data

Mar. 5, 2012  (TW) .............................. 101107369 A

(51) Int. Cl.
| | | |
|---|---|---|
| *B01D 71/28* | (2006.01) | |
| *B01D 69/12* | (2006.01) | |
| *C09D 153/00* | (2006.01) | |
| *B01D 71/76* | (2006.01) | |
| *B01D 71/80* | (2006.01) | |
| *C09D 5/16* | (2006.01) | |
| *C08F 293/00* | (2006.01) | |
| *B01D 65/08* | (2006.01) | |
| *B01D 71/34* | (2006.01) | |
| *B01D 71/36* | (2006.01) | |
| *B01D 71/40* | (2006.01) | |
| *B01D 71/52* | (2006.01) | |

(52) U.S. Cl.
CPC ................ *B01D 69/12* (2013.01); *B01D 71/76* (2013.01); *B01D 71/80* (2013.01); *C08F 293/005* (2013.01); *C09D 5/1668* (2013.01); *C09D 153/00* (2013.01); *B01D 71/28* (2013.01); *B01D 71/34* (2013.01); *B01D 71/36* (2013.01); *B01D 71/40* (2013.01); *B01D 71/52* (2013.01); *B01D 2325/38* (2013.01); *B01D 2325/48* (2013.01)

(58) Field of Classification Search
None
See application file for complete search history.

(56) References Cited

U.S. PATENT DOCUMENTS

2011/0207841 A1*  8/2011  Kosar et al. ................... 521/134
2011/0240550 A1* 10/2011  Moore et al. .................. 210/490

OTHER PUBLICATIONS

Chiag et, al., "Biofouling Resistance of Ultrafiltration Membranes Controlled by Surface Self-Assembled Coating with PEGylated Copolymers", Langmuir, Dec. 16, 2011, American Chemical Society.

* cited by examiner

*Primary Examiner* — Krishnan S Menon
*Assistant Examiner* — Ryan B Huang
(74) *Attorney, Agent, or Firm* — WPAT, PC; Justin King; Douglas Hosack

(57) ABSTRACT

The present invention provides an antibiofouling composition, an antibiofouling membrane and a method for forming the same. The antibiofouling composition comprises a copolymer and at least one solvent. The copolymer comprises at least one hydrophobic segment and at least one antibiofouling segment where the hydrophobic segment comprises a plurality of hydrophobic moieties and the antibiofouling segment comprises a plurality of antibiofouling moieties. The molar ratio of the total of hydrophobic moieties to the total of the antibiofouling moieties is 0.5~6.0.

8 Claims, 4 Drawing Sheets

US 9,346,022 B2

ANTIBIOFOULING COMPOSITION, ANTIBIOFOULING MEMBRANE AND METHOD FOR FORMING THE SAME

BACKGROUND OF THE INVENTION

1. Field of the Invention

The present invention is generally related to an antibiofouling coating composition, and more particularly to an antibiofouling coating composition, antibiofouling membrane and method for forming the same.

2. Description of the Prior Art

In biological applications, particularly biomedical technology, antibiofouling control is a very important topic. Especially, it is highly not anticipated to have nonspecific adsorption between biomolecules and the surface of materials in use. For example, adsorption or adherence of a small amount of biomolecules such as proteins usually causes propagation of unwanted bio-fouling reaction to result in inability of accomplishing the originally expected function.

The so-called "antibiofouling surface" means the surface of a material or an object is free of adsorption or adherence of biomolecules such as proteins, bacteria. The physical and chemical properties to constitute an "antibiofouling surface" are unclear yet although there are reports which postulate that an antibiofouling surface should be electrically neutral, hydrophilic, and have hydrogen bond acceptors but not hydrogen bond donors. However, there are many exceptions even fulfilling the above characteristics, that is, still being biofouling surfaces. (referring to Ostuni, E. et al., Langmuir (2001) 17(18)5605 and Luk, Y-Y., et al., Langmuir (2000) 16(24)9604)

Furthermore, regarding the rules of reducing biofouling, for example, it is believed that the increase of hydrophilic moieties on a hydrophobic material surface can effectively reduce its biofouling ability due to the reduced hydrophobic interactions. For example, the inventors reported that an ordered layer structure of hydrophilic domain and hydrophobic domain can improve bio-fouling resistance of the hydrophobic surface (Chang, Y. et at, J. Biomed. Mater. Res. 2010, 93, 400-408).

However, in order to process a surface to become an antibiofouling surface, a coating agent or coating composition should not only have antibiofouling surface ability after becoming a coating but also be anchored or adhered to the surface which is to be processed.

Although the above reports or other previous reports disclose various general rules or methods to control the antibiofouling characteristic, materials fulfilling these rules as a coating agent or coating composition may not have effective antibiofouling ability.

Besides, polytetrafluoroethylene (PTFE), polyvinylidene fluoride (PVDF) or polypropylene (PP) membranes are widely used as an ultrafiltration membrane because of their outstanding properties such as chemical resistance and thermal stability. However, the bio-fouling problem of these membranes was frequently criticized. In order to improve antibiofouling ability, strategies like blending PEG containing polymers before membrane formation or surface grafting of PEG moiety is proposed. In the polymer blending method before membrane formation, only limited PEG moieties can be incorporated into the membrane and the stability is not promising so that the improvement of the antibiofouling ability is limited. Although surface grafting has been shown highly efficient in improving bio-fouling resistance, large scale surface modification through this technique is still difficult and surface grafting also has problems of permanently changing the chemical and other properties of the membrane, low homogeneity, and high production cost. Therefore, an effective antibiofouling coating agent or coating composition is important and required to have such a hydrophobic membrane be surface treated and become being antibiofouling.

SUMMARY OF THE INVENTION

In accordance with the present invention, an antibiofouling coating composition, antibiofouling membrane and method for forming the same are provided. It is found that the prior general rule can be used to reduce antibiofouling ability but in practice a surface having excellent antibiofouling ability is required, that is, a surface being almost free of adsorption or adhesion of biomolecules is required but not a small adsorption amount, in order to be used in biological applications. Especially, it is useful in biomedical technology.

One object of the present invention is to provide an antibiofouling composition by using a copolymer comprising at least one hydrophobic segment and at least one antibiofouling segment with a specific ratio to achieve the optimum antibiofouling characteristic. In addition, the coating formed by the antibiofouling composition can adsorb on the coating surface without falling off.

One object of the present invention is to provide an antibiofouling membrane using the antibiofouling composition of the invention and method for forming the same. By a simple coating method, physical adsorption is used to have a hydrophobic membrane be surface treated by the antibiofouling composition to form the antibiofouling membrane. Therefore, a large-scaled surface can be treated easily by a coating method. Thus, the problem of coating a large-scaled surface and mass production by surface grafting can be solved.

Accordingly, the present invention discloses an antibiofouling composition, comprising: a copolymer, comprising at least one hydrophobic segment and at least one antibiofouling segment where the hydrophobic segment comprises a plurality of hydrophobic moieties, the antibiofouling segment comprises a plurality of antibiofouling moieties, and the molar ratio of the total of hydrophobic moieties to the total of the antibiofouling moieties is 0.5~6.0; and at least one solvent.

In one embodiment, preferably the molar ratio of the total of hydrophobic moieties to the total of the antibiofouling moieties is substantially 1.5~2.5.

In one embodiment, the copolymer is a diblock copolymer or a random copolymer. The diblock copolymer comprises one hydrophobic segment and one antibiofouling segment. The random copolymer comprises hydrophobic segments and antibiofouling segments randomly distributed or comprises hydrophobic moieties and antibiofouling moieties randomly distributed.

In one embodiment, the hydrophobic moieties are selected from the group consisting of the following: $C_3$~$C_{18}$ linear or branched alkyl, styryl, and styryl having at least one substituent of $C_3$~$C_{18}$ linear or branched alkyl.

In one embodiment, the antibiofouling moieties are derived from polyethylene glycol methacrylate (PEGMA).

In one embodiment, the copolymer is formed by atomic transfer radical polymerization using styrene or styrene having at least one substituent of $C_3$~$C_{18}$ linear or branched alkyl and polyethylene glycol methacrylate to polymerize under existence of a catalyst and an initiator.

Furthermore, the present invention discloses an antibiofouling membrane, being formed by a hydrophobic membrane and a copolymer coated on surfaces of the hydrophobic membrane, wherein the copolymer comprises at least one hydrophobic segment and at least one antibiofouling segment, the hydrophobic segment comprises a plurality of hydrophobic moieties, the antibiofouling segment comprises a plurality of antibiofouling moieties, and the molar ratio of the total of hydrophobic moieties to the total of the antibiofouling moieties is 0.5~6.0.

In one embodiment, the hydrophobic membrane is a polytetrafluoroethylene (PTFE) membrane, a polyvinylidene fluoride (PVDF) membrane, or a polypropylene membrane.

In one embodiment, preferably the molar ratio of the total of hydrophobic moieties to the total of the antibiofouling moieties is substantially 1.5~2.5.

In one embodiment, the copolymer is a diblock copolymer or a random copolymer.

In one embodiment, the hydrophobic moieties are selected from the group consisting of the following: $C_3$~$C_{18}$ linear or branched alkyl, styryl, and styryl having at least one substituent of $C_3$~$C_{18}$ linear or branched alkyl.

In one embodiment, the antibiofouling moieties are derived from polyethylene glycol methacrylate (PEGMA).

In one embodiment, the copolymer is formed by atomic transfer radical polymerization using styrene or styrene having at least one substituent of $C_3$~$C_{18}$ linear or branched alkyl and polyethylene glycol methacrylate to polymerize under existence of a catalyst and an initiator.

Furthermore, the present invention discloses a method for forming an antibiofouling membrane, comprising: providing a hydrophobic membrane; coating the antibiofouling composition according to the invention on the hydrophobic membrane; and drying the antibiofouling composition coated on the hydrophobic membrane to obtain the antibiofouling membrane. In addition, the present invention discloses a method for preparing a copolymer to be applied in an antibiofouling composition and the method comprises: providing a monomer having at least one hydrophobic moiety wherein the hydrophobic moiety is selected from the group consisting of the following: $C_3$~$C_{18}$ linear or branched alkyl, styryl, and styryl having at least one substituent of $C_3$~$C_{18}$ linear or branched alkyl; providing polyethylene glycol methacrylate having a preset molecular weight; and using atomic transfer radical polymerization to polymerize the monomer and polyethylene glycol methacrylate under existence of a catalyst and an initiator.

In one embodiment, the above solvent is at least one solvent selected from the group consisting of the following: dimethylacetamide, methanol, ethanol, and isopropyl alcohol.

In conclusion, according to the antibiofouling composition of embodiments of the invention, the antibiofouling composition can be used to coat and process a surface so that the processed surface has excellent antibiofouling ability, that is, is free of biomolecule adsorption and has excellent coating stability, that is, antibiofouling durability. The antibiofouling coating is difficult to fall off. Furthermore, according to the antibiofouling membrane and the method for forming the same, the antibiofouling composition according to the invention is used to process a hydrophobic membrane to have the hydrophobic membrane having excellent antibiofouling ability and durability. Besides, the method can be easily utilized in large-scaled surfaces and irregular surfaces as well as for mass production easily. Thus, the production cost can be further decreased.

DESCRIPTION OF THE PREFERRED EMBODIMENTS

Figure 1:
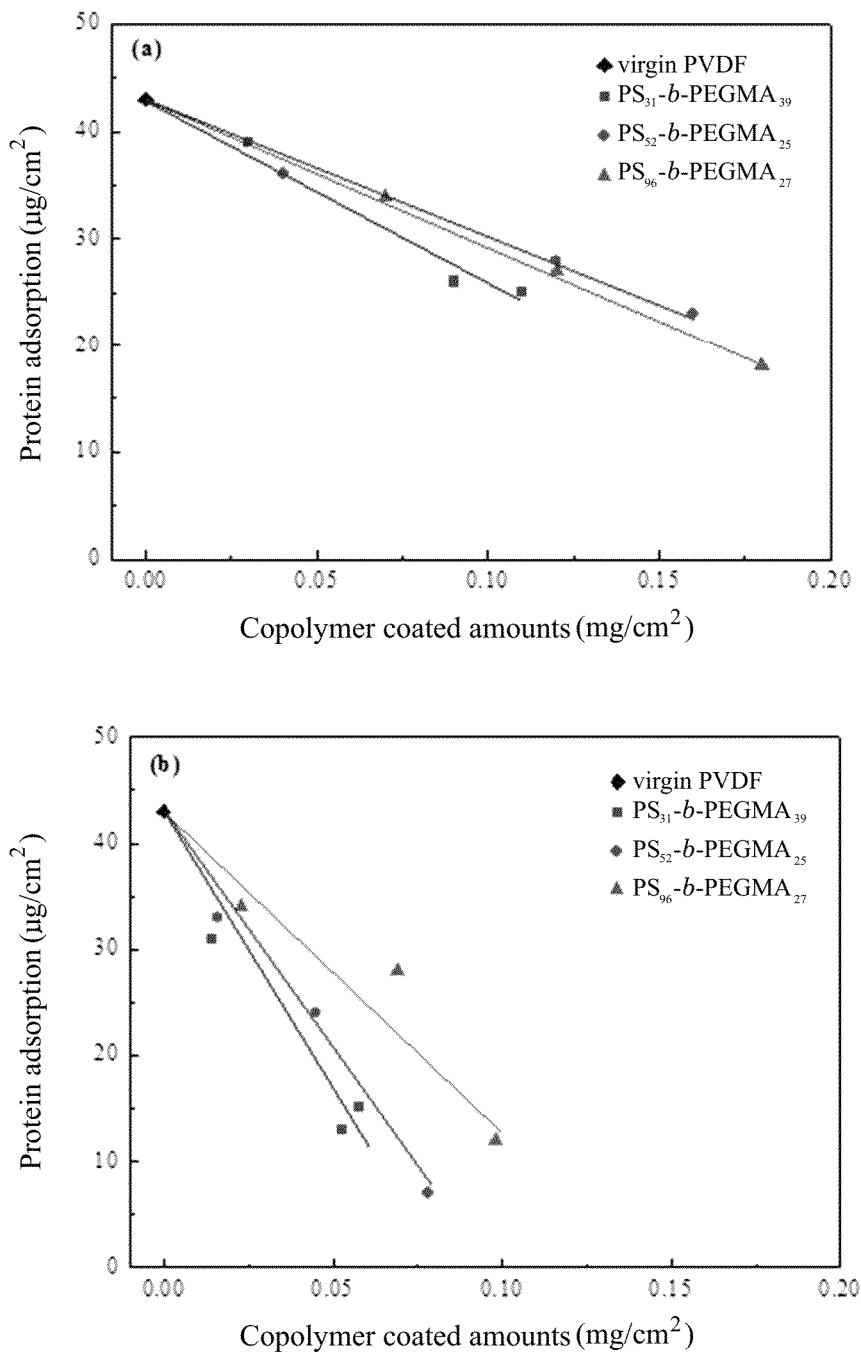
FIG. 1 shows the relationship between protein adsorption and coating amounts from the protein adsorption experiment of the antibiofouling membrane according to one embodiment of the present invention.

What is probed into the invention is an antibiofouling composition, antibiofouling membrane and method for forming the same. Detail descriptions of the steps, compositions and elements will be provided in the following in order to make the invention thoroughly understood. Obviously, the application of the invention is not confined to specific details familiar to those who are skilled in the art. On the other hand, the common steps, compositions and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

The antibiofouling composition according to the invention is surface coated and physically adsorbs to an object, especially an ultrafiltration membrane to improve the antibiofouling property of the object (or the membrane). However, although physical adsorption is easy to apply, the problem of coating stability has to be solved. Therefore, the effective components of the antibiofouling composition should be specially designed (for example, having special structures and compositions) to achieve the coating stability besides the antibiofouling property. Thus, the antibiofouling composition according to the invention has coating stability and can be easily applied to various surfaces and easily scaled up. In addition, the antibiofouling composition according to the invention does not change the structure of the membrane.

In one embodiment of the present invention, an antibiofouling composition is provided. The antibiofouling composition comprises: a copolymer, comprising at least one hydrophobic segment and at least one antibiofouling segment where the hydrophobic segment comprises a plurality of hydrophobic moieties, the antibiofouling segment comprises a plurality of antibiofouling moieties, and the molar ratio of the total of hydrophobic moieties to the total of the antibiofouling moieties is 0.5~6.0; and at least one solvent.

In one embodiment, the hydrophobic moieties are selected from the group consisting of the following: $C_3$~$C_{18}$ linear or branched alkyl, styryl, and styryl having at least one substituent of $C_3$~$C_{18}$ linear or branched alkyl. For example, $C_3$~$C_{18}$ linear or branched alkyl is propyl, butyl, pentyl, hexyl, heptyl, octyl, nonyl, decyl, dodecyl, tridecyl, isopropyl, isobutyl, isopentyl, isooctyl, etc. where $C_3$~$C_{18}$ means that the number of carbon atoms is $C_3$~$C_{18}$.

In one embodiment, the antibiofouling moieties are derived from polyethylene glycol methacrylate (PEGMA).

The copolymer can be a diblock copolymer such as AAA . . . -BBB . . . , or a random copolymer such as ABA-BAABB . . . or AAAABBBABAA . . . . In this specification, the copolymer is represented by "$A_nB_m$" where "n" represents the total number of hydrophobic moieties and "m represents the total number of antibiofouling moieties. When the ratio of n to m (n:m) is between 0.5~6.0, an excellent antibiofouling characteristic can be shown. In other words, a hydrophobic moiety is treated as a unit and the total number of hydrophobic moieties is the sum of the hydrophobic moieties. Similarly, an antibiofouling moiety is treated as a unit and the total number of antibiofouling moieties is the sum of the antibiofouling moieties. The molar number of hydrophobic moieties is the same as that of the hydrophobic segments. The molar number of antibiofouling moieties is the same as that of the antibiofouling segments.

The above copolymer is synthesized by atomic transfer radical polymerization of a monomer having at least one hydrophobic moiety and a macromolecule under existence of a catalytic system and an initiator. The monomer having at least one hydrophobic moiety is for example selected from the group consisting of the following: $C_3$~$C_{18}$ linear or branched alkyl, styryl, and styryl having at least one substituent of $C_3$~$C_{18}$ linear or branched alkyl. The macromolecule is for example polyethylene glycol methacrylate having a preset molecular weight (for example, 500 Da, etc.). For example, in one embodiment, the catalytic system is CuBr/2,2'-bipyridine (CuBr/bpy) and the initiator is methyl 2-bromopropionate (MBrP).

In one embodiment, when the molar ratio of the total of hydrophobic moieties to the total of the antibiofouling moieties is substantially 1.5~2.5, after the coating film is formed, a better antibiofouling characteristic is achieved.

The above solvent can be any solvent or solvent mixture to dissolve the above copolymer, such as dimethylacetamide (DMAc), methanol, ethanol, isopropyl alcohol, etc.

The blending or mixing ratio of the copolymer to the solvent (copolymer/solvent) can be adjusted according to the expected coating amounts and the characteristics of the processed surface. For example, the mixing ratio (copolymer/solvent) can be 0.01~10 mg/ml, preferably 0.1~10 mg/ml, and more preferably 0.5~5 mg/ml. Under the ideal mixing ratio (copolymer/solvent), the coating amounts (copolymer to the material surface) can be controlled to 0.01~1.2 mg/cm$^2$, preferably 0.05~0.25 mg/cm$^2$.

Furthermore, according to another embodiment of the invention, an antibiofouling membrane, comprising a hydrophobic membrane and a copolymer coated on the surface of the hydrophobic membrane. The copolymer comprises at least one hydrophobic segment and at least one antibiofouling segment where the hydrophobic segment comprises a plurality of hydrophobic moieties, the antibiofouling segment comprises a plurality of antibiofouling moieties, and the molar ratio of the total of hydrophobic moieties to the total of the antibiofouling moieties is 0.5~6.0.

In one embodiment, the hydrophobic membrane is a polytetrafluoroethylene (PTFE) membrane, a polyvinylidene fluoride (PVDF) membrane, or a polypropylene membrane.

In one embodiment, the antibiofouling moieties are derived from polyethylene glycol methacrylate (PEGMA).

In one embodiment, the copolymer is a diblock copolymer or a random copolymer.

Furthermore, according to another embodiment of the invention, a method for forming an antibiofouling membrane is provided. The method comprises: providing a hydrophobic membrane; coating the antibiofouling composition according to the invention on the hydrophobic membrane; and drying the antibiofouling composition coated on the hydrophobic membrane to obtain the antibiofouling membrane. In addition, a method for preparing a copolymer applied in an antibiofouling composition is provided and the method comprises: providing a monomer having at least one hydrophobic moiety wherein the hydrophobic moiety is selected from the group consisting of the following: $C_3$~$C_{18}$ linear or branched alkyl, styryl, and styryl having at least one substituent of $C_3$~$C_{18}$ linear or branched alkyl; providing polyethylene glycol methacrylate having a preset molecular weight; and using atomic transfer radical polymerization to polymerize the monomer and polyethylene glycol methacrylate under existence of a catalyst and an initiator.

EXAMPLES

The following examples use styrene as the source of hydrophobic moieties of the copolymer according to the invention and polyethylene glycol methacrylate (PEGMA) as the source of antibiofouling moieties for one example of embodiments of the invention but the invention is not limited to this example.

Example 1

Preparation of Diblock Copolymers

At first, a prepolymer having the PS (polystyrene) block is synthesized by atomic transfer radical polymerization of a monomer having at least one hydrophobic moiety and a macromolecule under existence of CuBr/2,2'-bipyridine (CuBr/bpy) and methyl 2-bromopropionate (MBrP) under nitrogen in a dry box. For the polymerization of PS block with different molecular weights, styrene (42.2 mmol) was polymerized under bulk using [styrene]/[MBrP]/[CuBr]/[bpy]=30/1/1/2, 50/1/1/2, and 90/1/1/2 at 120° C. After 24 h, $^1$H NMR analysis indicated that 99% of the styrene monomers had been polymerized. The resulting reaction solution diluted with 45 mL of THF was passed through an aluminum oxide column, precipitated into 300 mL of methanol, and redissolved into THF repeatedly three times to remove residue ATRP catalysts. This purification protocol resulted in the loss of up to 30% styrene homopolymer due to adsorption. After solvent evaporation, the copolymer was dried in a vacuum oven at room temperature to yield a white powder. THF GPC analysis indicated the prepared PS homopolymers with a set of $M_w$ around 3389 ($PS_{31}$), 5529 ($PS_{52}$), and 10130 ($PS_{96}$) and a controlled range of $M_w/M_n$ between 1.20-1.30.

For the following polymerization of second block of PEGMA, PEGMA (3.79 mmol, purchased from Aldrich, a molecular weight of 500 DA and an average number of ethylene glycol units of about 10) was polymerized in 5.5 mL of THF with $PS_{31}$, $PS_{52}$, and $PS_{96}$ as the macro-initiators using [PEGMA]/[PS]/[CuBr]/[bpy]=10/1/1/2-25/1/1/2 at 60° C. After 24 h, $^1$H NMR analysis indicated that 50%-65% of the PEGMA macromonomers had been polymerized. The resulting reaction solution diluted with 30 mL of THF was passed through an aluminum oxide column, precipitated into 250 mL of ether/hexane, and redissolved into THF repeatedly three times to remove residue ATRP catalysts. Finally, the copolymer was dried in a vacuum oven at room temperature to yield a white powder. The product is a diblock copolymer $PS_x$-b-$PEGMA_y$, where x and y represent the number of PS moieties and the number of PEGMA moieties, respectively. For example, $PS_{31}$-b-$PEGMA_{39}$ indicates a block copolymer having 31 PS moieties and 39 PEGMA moieties and "b" indicates "block". The molar mass ratios of PS/PEGMA in the prepared diblock copolymers were controlled with a set of 0.8 ($PS_{31}$-b-$PEGMA_{39}$), 2.1 ($PS_{52}$-b-$PEGMA_{25}$), and 3.6 ($PS_{96}$-b-$PEGMA_{27}$) and a range of $M_w/M_n$ between 1.10-1.20, as summarized in Table 1.

TABLE 1

| Sample | $M_w$ (g/mol) | $M_w/M_n$ | PS (mol %) | PEGMA (mol %) | PS/PEGMA |
|---|---|---|---|---|---|
| Virgin PVDF | — | — | — | — | — |
| $PS_{31}$-b-$PEGMA_{39}$ | 21965 | 1.17 | 44 | 56 | 0.8 |
| $PS_{31}$-b-$PEGMA_{46}$ | 24575 | 1.18 | 40 | 60 | 0.7 |
| $PS_{31}$-b-$PEGMA_{55}$ | 29454 | 1.07 | 36 | 64 | 0.6 |
| $PS_{52}$-b-$PEGMA_{25}$ | 17423 | 1.13 | 68 | 32 | 2.1 |
| $PS_{96}$-b-$PEGMA_{27}$ | 23036 | 1.17 | 78 | 22 | 3.6 |
| $PS_{47}$-r-$PEGMA_{52}$ | 29753 | 1.43 | 47 | 53 | 0.9 |
| $PS_{20}$-r-$PEGMA_{12}$ | 8124 | 1.48 | 63 | 38 | 1.7 |
| $PS_{26}$-r-$PEGMA_{7}$ | 6077 | 1.41 | 79 | 21 | 3.7 |

Example 2

Preparation of Random Copolymers

Poly(styrene-random-poly(ethylene glycol) methacrylate) ($PS_x$-r-$PEGMA_y$) was also synthesized using ATRP method under nitrogen in dry box. To control the similar ratios of PS/PEGMA in the PS-r-PEGMA compared with PS-b-PEGMA, styrene (9.6 mmol) was polymerized in 10.0 mL of THF with different molar mass ratios of PEGMA as the comonomers using [styrene]/[PEGMA]/[MBrP]/[CuBr]/[bpy]=25/6/1/1/2, 30/15/1/1/2, and 50/50/1/1/2 at 60° C. After 24 h, $^1$H NMR analysis of the reaction solution indicated that 60%-65% of the total styrene and PEGMA monomers had been polymerized. The purification process of the prepared PS-r-PEGMA followed the same protocol of the previous description of the prepared PS-b-PEGMA. From the combination of THF GPC analysis, the molar mass ratios of PS/PEGMA in the prepared random copolymers were controlled with a set of 0.9 ($PS_{47}$-r-$PEGMA_{52}$), 1.7 ($PS_{20}$-r-$PEGMA_{12}$), and 3.7 ($PS_{26}$-r-$PEGMA_{7}$) and a range of $M_w/M_n$ between 1.40-1.50.

Example 3

Preparation of Antibiofouling Compositions

The copolymers prepared in examples 1 and 2 are dissolved in DMAc with a ratio (copolymer/solvent) of 0.1-10 mg/mL to constitute antibiofouling compositions.

Example 4

Antibiofouling Surface Treatment of PVDF Membrane

At first, a PVDF ultrafiltration membrane is prepared. Then, the cleaned PVDF membrane was soaked in an ethanol solution and then incubated with various concentration of PS-b-PEGMA and PS-r-PEGMA copolymer solution in the range of 0.1-10 mg/mL for 30 min. The membrane was rinsed with ethanol in 50% v/v water repeatedly three times to remove weakly adsorbed copolymers. Finally, the residual solvent was removed in a vacuum oven under reduced pressure for 1 days.

Example 5

Protein Adsorption Test

The untreated PVDF membrane (virgin PVDF) and PVDF membranes treated by are $PS_{47}$-r-$PEGMA_{52}$, $PS_{29}$-r-$PEGMA_{12}$, $PS_{26}$-r-$PEGMA_{7}$, $PS_{31}$-b-$PEGMA_{39}$, $PS_{52}$-b-$PEGMA_{25}$ and $PS_{96}$-b-$PEGMA_{27}$ are used in the protein adsorption test. The protein adsorption test uses adsorption of BSA (Bovin serum albumin, from Sigma) onto the membrane to evaluate based on the method of Bradford according to the standard protocol of the Bio-Rad protein assay. The membranes coated with the compositions in example 4 with a 20 cm$^2$ surface area was rinsed with 20 mL of ethanol for 30 min and transferred into a clean test tube, followed by the addition of 20 mL of PBS solution for 30 min. Then, the membrane was soaked in 5 mL of 1 mg/mL BSA in 0.1 M PBS solution (PH 7.4) for 24 h at 37° C. respectively. The membrane was then followed by the addition of dye reagent containing Coomassie Brilliant Blue G-250 and was incubated for 5 minutes. The absorbance at 595 nm was determined by a UV-VIS spectrophotometer. FIG. 1 shows the relationship between protein adsorption and coating amounts from the protein adsorption experiment of the antibiofouling membrane. From the result of FIG. 1, the membrane coated with a PS/PEGMA ratio of 2/1 has the best antibiofouling result.

Example 6

Bacterial Adhesion Test

Figure 2:
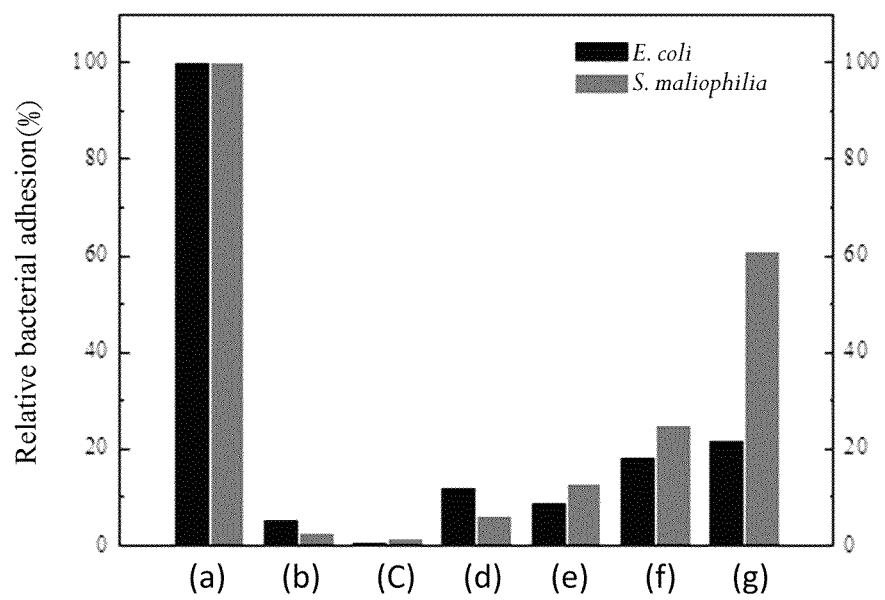
FIG. 2 shows the bacterial adhesion result of various copolymer-coated antibiofouling membranes according to one embodiment of the present invention.

The untreated PVDF membrane (a) (virgin PVDF) and PVDF membranes treated by are (b) $PS_{96}$-b-$PEGMA_{27}$, (c) $PS_{52}$-b-$PEGMA_{25}$, (d) $PS_{31}$-b-$PEGMA_{39}$, (e) $PS_{26}$-r-$PEGMA_{7}$, (f) $PS_{20}$-r-$PEGMA_{12}$, and (g) $PS_{47}$-r-$PEGMA_{52}$ are used in the bacterial adhesion test. Two bacterial species, Escherichia coli and Stenotrophomonas maltophilia, were used to investigate bacterial adhesion behavior on the treated surfaces by the above compositions. FIG. 2 shows the bacterial adhesion result of various copolymer-coated antibiofouling membranes. Sample (c) shows the best antibiofouling result.

Example 7

Antibiofouling Durability Test

Figure 3:
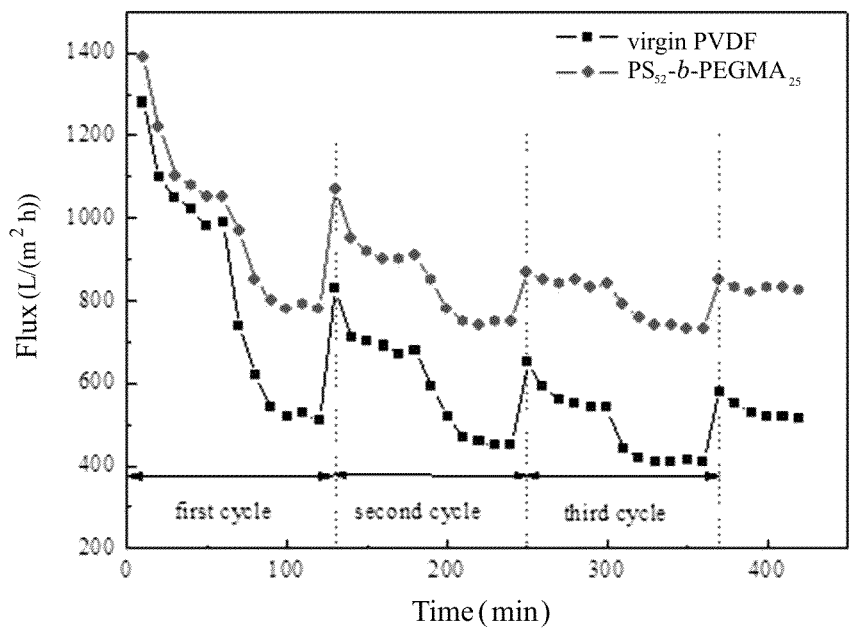
FIG. 3 shows the durability test result of BSA (Bovine serum albumin) solution for the antibiofouling membrane according to one embodiment of the present invention.

The antibiofouling durability test is performed by coating stability of the antibiofouling composition. The PVDF membrane treated with the $PS_{52}$-b-$PEGMA_{25}$ composition and the untreated PVDF membrane (virgin PVDF) as the control group are used in the antibiofouling durability test using Bovine serum albumin (BSA) as a possible protein bio-fouling in the solution and humic acid (HA) as a polysaccharide bio-fouling. The evaluation method is done by cyclic filtration from step (1) to step (3) as a cycle. The first step (step (1)) was pure water filtration. Pure water was passed through the membrane until a steady flux was obtained, which was designated as $J_{wi}$. The second step (step (2)) was the pass of 1 mg/mL BSA solution. The steady permeation flux was measured and designated as $J_{Pi}$. The third step (step (3)) was a simple membrane cleaning procedure through rinsing the membrane by pure water. FIG. 3 shows the durability test result of BSA (Bovine serum albumin) solution for the antibiofouling membrane. It was found that the $PS_{52}$-b-$PEGMA_{25}$ coated membrane had a slightly higher pure water flux $J_{w1}$ than the virgin one. It indicated that the polymer coating had limited effect on the physical structure of membrane. The slightly higher water flux was probably due to the increase in surface hydrophilicity. It could also be observed that the permeation flux of BSA solution through the virgin PVDF membrane continuously decreased after each cycle. But the permeation flux through the $PS_{52}$-b-$PEGMA_{25}$ coated membrane decreased only slightly after each cycle. It indicated that the $PS_{52}$-b-$PEGMA_{25}$ coating was effective against BSA adsorption. In addition, BSA was found to flow freely through the membrane. The limited reduction in the permeation flux of BSA solution indicated that the $PS_{52}$-b-$PEGMA_{25}$ block copolymer was coated to the inner pores of PVDF membrane in addition to the outer surface. From the experimental results, coating stability test showed that the $PS_{52}$-b-$PEGMA_{25}$ coating was stable over 30 washings.

Figure 4:
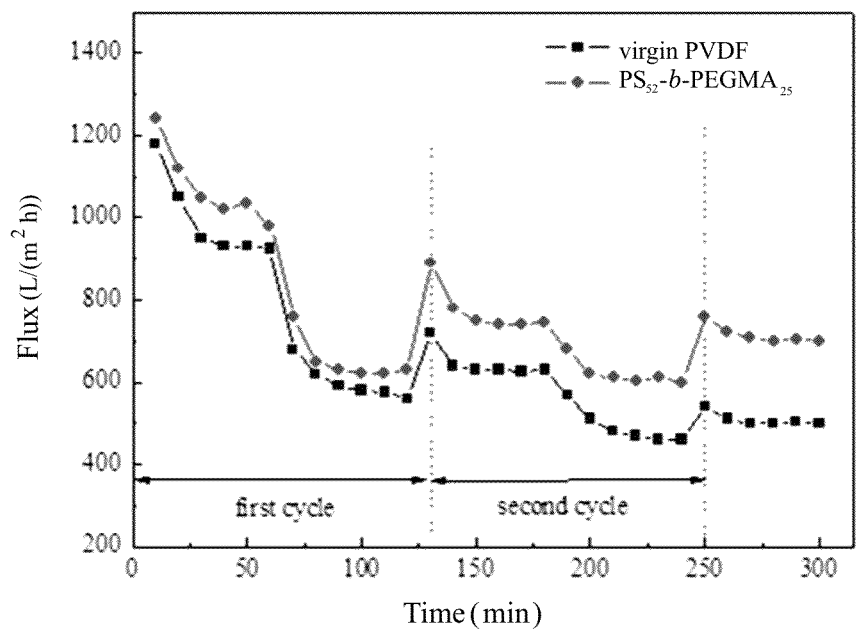
FIG. 4 shows the durability test result of HA (Humic acid) solution for the antibiofouling membrane according to one embodiment of the present invention.

FIG. 4 shows the durability test result of HA (Humic acid) solution for the antibiofouling membrane. Similarly, for HA (Humic acid) solution, the permeation flux of HA solution through the virgin PVDF membrane continuously decreased after each cycle but permeation flux through the $PS_{52}$-b-$PEGMA_{25}$ coated membrane decreased only slightly. From the experimental results, coating stability test showed that the $PS_{52}$-b-$PEGMA_{25}$ coating was stable over 30 washings.

Therefore, according to the antibiofouling composition of embodiments of the invention, the antibiofouling composition can be used to coat and process a surface so that the processed surface has excellent antibiofouling ability, that is, is free of biomolecule adsorption and has excellent coating stability, that is, antibiofouling durability. The antibiofouling coating is difficult to fall off. Furthermore, according to the antibiofouling membrane and the method for forming the same, the antibiofouling composition according to the invention is used to process a hydrophobic membrane to have the hydrophobic membrane having excellent antibiofouling ability and durability. Besides, the method can be easily utilized in large-scaled surfaces and irregular surfaces as well as for mass production easily. Thus, the production cost can be further decreased.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. An antibiofouling membrane, being formed by a hydrophobic membrane which is a polytetrafluoroethylene (PTFE) membrane, a polyvinylidene fluoride (PVDF) membrane, or a polypropylene membrane and a copolymer coated stable on a surface of the hydrophobic membrane, wherein the copolymer which is selected from the group consisting of a diblock copolymer and a random copolymer, comprises at least one hydrophobic segment and at least one antibiofouling segment, the hydrophobic segment comprises a plurality of hydrophobic moieties which are derived from polystyrene (PS) having a molecular weight (Mw) between 3000 and 11000DA and, the antibiofouling segment comprises a plurality of antibiofouling moieties which are derived from polyethylene glycol methacrylate (PEGMA) having a molecular weight of 500DA, and the molar mass ratio of PS/PEGMA in the diblock copolymer being 1.5~2.5, and a coating amount of the copolymer to the surface is 0.01~1.2mg/cm².

2. The antibiofouling membrane according to claim 1, wherein the diblock copolymer is $PS_{52}$-b-$PEGMA_{25}$.

3. The antibiofouling membrane according to claim 1, wherein the diblock copolymer is $PS_{31}$-b-$PEGMA_{39}$.

4. The antibiofouling membrane according to claim 1, wherein the diblock copolymer is $PS_{96}$-b-$PEGMA_{27}$.

5. The antibiofouling membrane according to claim 1, wherein the polystyrene having the molecular weight(Mw) between 5500 and 5600DA.

6. The antibiofouling membrane according to claim 1, wherein the coating amount of the copolymer to the surface is 0.05~0.25mg/cm².

7. A antibiofouling membrane, said antibiofouling membrane being formed by a polytetrafluoroethylene (PTFE) membrane and a diblock copolymer solution comprising $PS_{52}$-b-$PEGMA_{25}$, the $PS_{52}$-b-$PEGMA_{25}$ is coated stable on a surface of the polytetrafluoroethylene (PTFE) membrane, wherein the $PS_{52}$-b-$PEGMA_{25}$ is derived from polystyrene and polyethylene glycol methacrylate (PEGMA) having a molecular weight of 500DA by atomic transfer radical polymerization, and the concentration of $PS_{52}$-b-$PEGMA_{25}$ is 0.1-10 mg/mL.

8. The antibiofouling membrane according to claim 7, wherein the Mw molecular weight of the $PS_{52}$-b-$PEGMA_{25}$ ranges from 17000~18000DA.

* * * * *